United States Patent [19]

Shelley

[11] Patent Number: 5,279,501

[45] Date of Patent: Jan. 18, 1994

[54] SCREW CONVEYOR

[75] Inventor: Harold A. Shelley, Nicholasville, Ky.

[73] Assignee: Caterpillar Paving Products Inc., Minneapolis, Minn.

[21] Appl. No.: 898,272

[22] Filed: Jun. 15, 1992

[51] Int. Cl.$^5$ ............................................. E01C 19/18
[52] U.S. Cl. ................................. 404/118; 198/664; 198/665
[58] Field of Search ................ 404/118, 108; 198/664, 198/665, 677

[56] References Cited

U.S. PATENT DOCUMENTS

| 297,675 | 4/1884 | Chambers, Jr. | 198/664 |
| 307,904 | 11/1884 | Bing | 198/664 |
| 721,890 | 3/1903 | Henius | 198/664 X |
| 1,211,398 | 1/1917 | Burgard | 198/665 |
| 4,364,667 | 12/1982 | Reiner | 198/664 X |
| 4,408,947 | 10/1983 | Lenski et al. | 414/526 |
| 4,934,864 | 6/1990 | Mauldin | 404/108 |
| 5,002,426 | 3/1991 | Brown et al. | 404/92 |

FOREIGN PATENT DOCUMENTS

0261093B1 7/1991 European Pat. Off. .

Primary Examiner—William P. Neuder
Attorney, Agent, or Firm—Robert A. McFall

[57] ABSTRACT

A screw conveyor in which mixing and flow-directing paddles are selectively adjustable for use on a wide variety of materials having dissimilar flow characteristics. The adjustable paddles are advantageously applied to a screw, or auger, conveyor of an asphalt paving machine to convey a sufficient amount of unsegregated paving material beneath a center drive case or other problem distribution area.

1 Claim, 2 Drawing Sheets

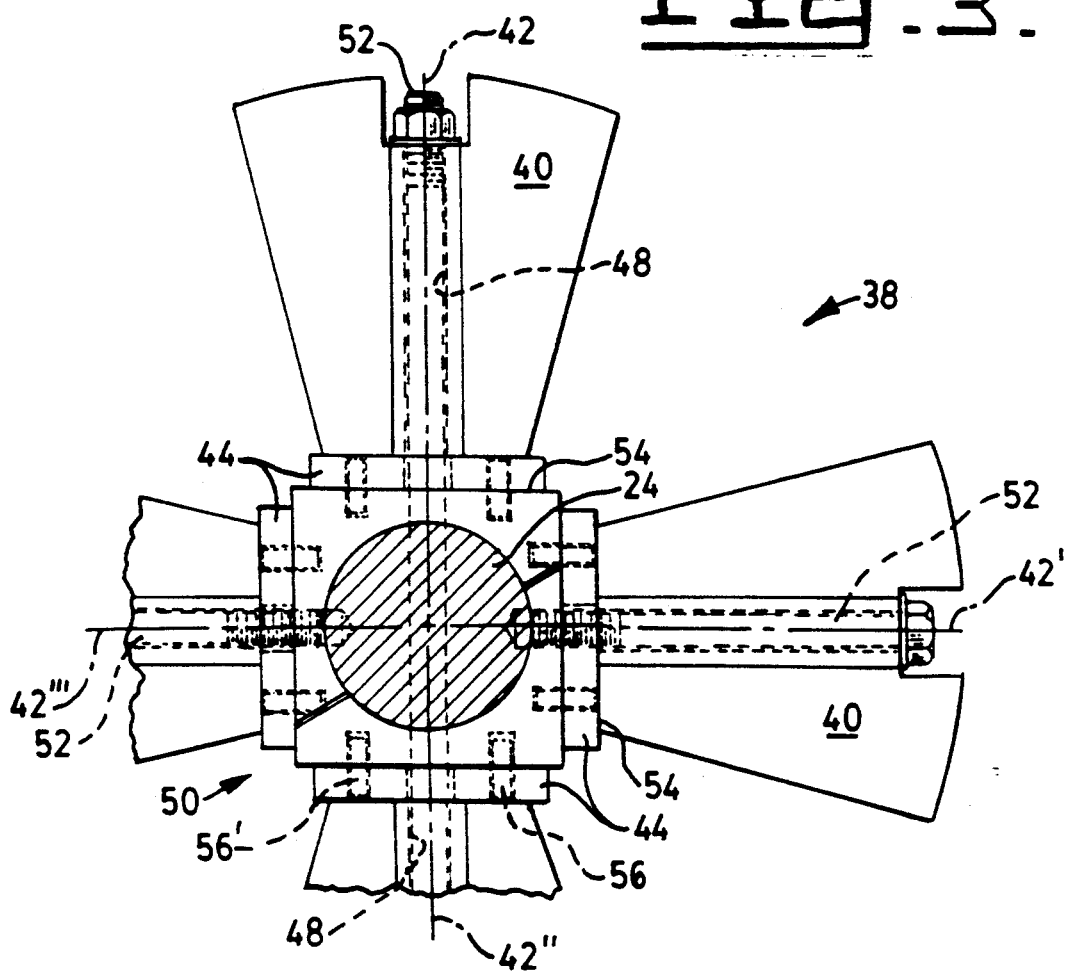
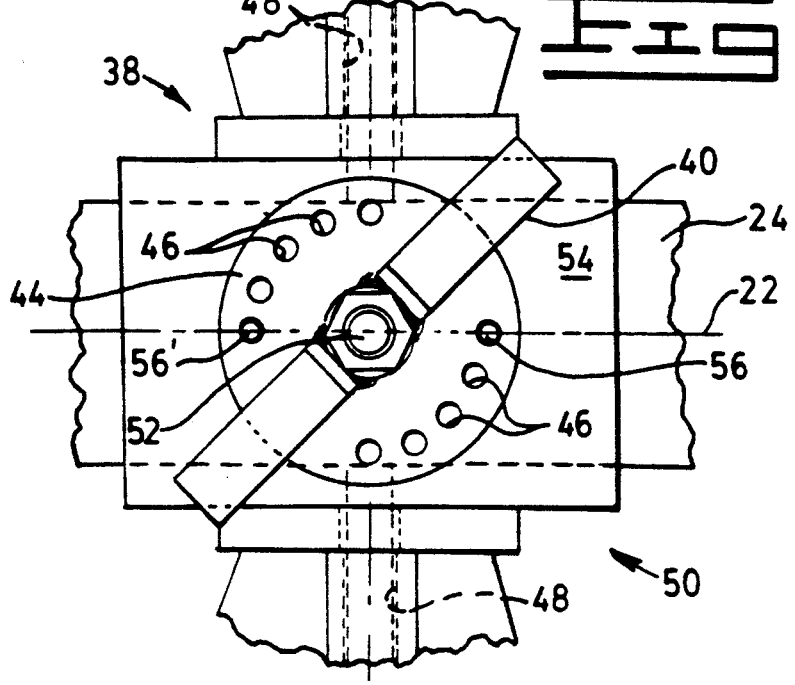

SCREW CONVEYOR

TECHNICAL FIELD

This invention relates generally to a screw conveyor and more particularly to a screw conveyor in which a portion of the conveying surface is shaped as a paddle.

BACKGROUND ART

Conveyors consisting of a continuous or broken-blade helix or screw fastened to a shaft and rotatably driven so that the revolving screw advances material in a predetermined direction are well known. More recently, a portion of the helix or screw in such conveyors has been replaced by individual paddles. The paddles are useful for mixing the conveyed material and for moving the material in a desired direction which may be different than the direction of movement determined by the revolving screw section of the conveyor.

In particular, screw conveyors, or augers, have been advantageously used on paving machines to convey road building materials transversely across the roadbed prior to being leveled and at least partially compacted by a trailing screed assembly. For example, the BG-200B Series Asphalt Pavers manufactured by the assignee of the present invention have hydrostatically driven dual left and right side screw conveyors which operate independently of each other to distribute asphalt paving material across the roadbed, transverse to the direction of travel of the paving machine.

Aggregate mixes such as asphalt paving materials are subject to segregation during movement Transverse segregation of the material is a problem that frequently occurs during lateral distribution of the paving material onto a roadway surface. This problem, more commonly known as "center streak" occurs when a disproportionate amount of coarse aggregate is deposited at the center of the mat being formed. Typically, asphalt material is transferred from a surge bin, or hopper, to the roadway surface, including an area at the transverse center of the machine which lies under a centrally disposed chain drive case for the lateral distribution screw. If not properly mixed, or otherwise inhibited from segregation, coarse aggregate in the asphalt mix tends to roll under the central drive case, fill the underlying region, and inhibit the entrance of smaller aggregate and fines. This produces an area, or strip, of coarse aggregates with few fines to fill voids and bind the mix together. Without the necessary binding materials, the coarse aggregate breaks loose from the road surface, producing a condition commonly known as "ravelling."

In response to this problem, the screw conveyors may have individual paddles disposed near their inboard ends to mix and direct a portion of the paving material inwardly toward the transverse center of the paving machine. This solution works well for some paving materials, but less desirably for others. For example, if the orientation of the paddles is designed to provide the optimum pitch angle for mixing and conveying a selected hot asphalt mix, it will be less effective in distributing other mixes, such as a cold mix or an in-place recycled mix. As a result, it is often necessary to compromise the designed pitch angle of the paddles to provide generally acceptable, but not optimum, mixing and distribution of the more commonly used material mixtures.

The present invention is directed to overcoming the problems set forth above. It is desirable to have a screw conveyor that can be selectively adjusted for changes in the flow characteristics of the conveyed material. Furthermore, it is desirable to have a screw conveyor in which mixing and flow-directing paddles are selectively adjustable for use on a wide variety of materials having dissimilar flow characteristics.

DISCLOSURE OF THE INVENTION

In accordance with one aspect of the present invention, a screw conveyor having a longitudinal axis comprises a rotatable shaft concentrically disposed with respect to the longitudinal axis, and first and second material contacting members. The first material contacting member is attached to the shaft and has a predefined surface that is angularly oriented in a fixed predetermined relationship with the respect to the longitudinal axis. The second material contacting member is detachably connected to the shaft and has at least one predefined surface portion that is selectively angularly adjustable about an axis extending radially outwardly from the longitudinal axis of the conveyor.

BRIEF DESCRIPTION OF THE DRAWINGS

FIG. 3 is a partial sectional view, taken along the lines 3—3 of FIG. 2, showing the adjustable material contacting member of the screw conveyor embodying present invention; and, FIG. 4 is a plan view showing a hub portion of the adjustable material contacting member.

BEST NODE FOR CARRYING OUT THE INVENTION

Figure 1:
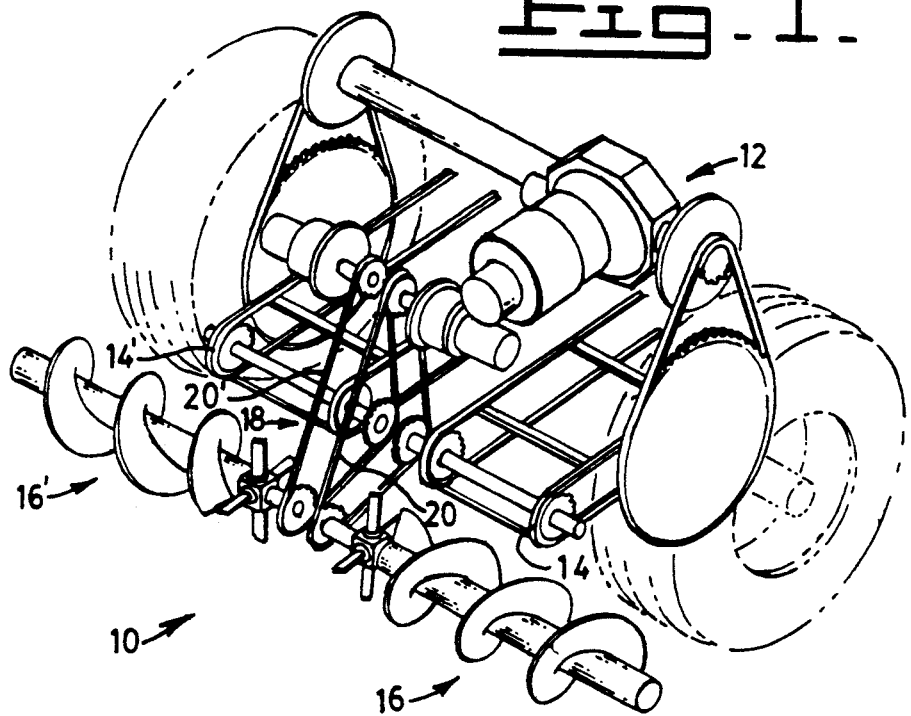
FIG. 1 is a perspective view of portions of a paving machine having a screw conveyor embodying the present invention.

In the preferred embodiment of the present invention, a screw conveyor 10 is rotatably mounted on the rearward end of an asphalt paver 12. In this embodiment, a pair of feeder conveyors 14,14' deliver paving material from a forwardly positioned hopper, not shown, to a respective portion of the screw conveyor 10 which, as shown in FIG. 1, is divided into right side and left side screws 16,16'. The right and left side feeders and screws 14,14',16,16' are hydrostatically driven at a controlled speed that is independent of the forward speed of the paver 12 and of each other. The feeders and screws are driven by a center drive system 18 consisting of two variable displacement pumps and motors which drive planetary reduction gears with a chain drive 20,20' separately connected to each side of the feeders 14,14' and screws 16,16'.

For the sake of simplicity and clarity, the present invention will be described with respect to the right side screw 16 of the screw conveyor 10. It should be understood that the description of the elements comprising the right screw 16 apply equally to the left screw 18. Alternatively, the screw conveyor 10 may comprise a screw assembly having a single shaft extending across both left and right hand sides of the machine.

Figure 2:
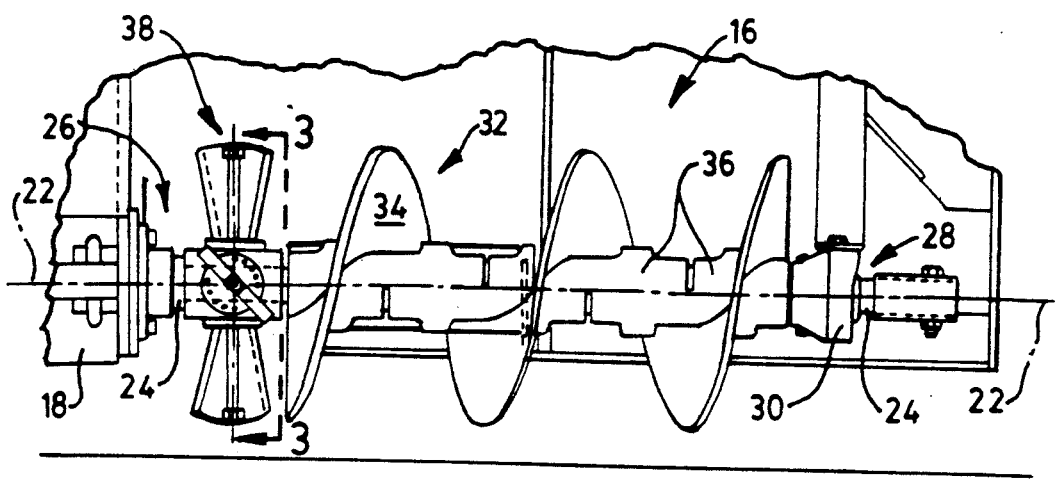
FIG. 2 is a view, in elevation, of a portion of the rear of a paving machine showing, in more detail, a screw conveyor embodying the present invention.

As best shown in FIG. 2, the screw conveyor 10 has a longitudinal axis 22 and a shaft 24 concentrically disposed with respect to the axis 22. The shaft 24 is rotatably attached at a first, or inner, end 26 to the center drive assembly 18. The shaft 24 also has a second, or outer, end 28 that is rotatably mounted in an outboard bearing assembly 30. The shaft 24 is rotated in a predetermined direction about the longitudinal axis 22 by the chain drive 20 which is driven by a respective one of the aforementioned hydrostatic motors.

The screw conveyor 10 also has a first material contacting member 32 having a predefined surface 34, angularly oriented in a fixed predetermined relationship with respect to the longitudinal axis 22 so that the revolving screw advances material along the axis in a direction outwardly from the first end 26 of shaft 24 towards the second end 28. The first material contacting member 32 preferably comprises a plurality of helically curved segments 36 arranged so that the surface 34 is essentially a single continuous surface. The segments 36 of the first material contacting member 32 are preferably detachably mounted on the shaft by removable fasteners such as bolts so that worn segments may be easily replaced.

Importantly, the screw conveyor 10 also has a second material contacting member 38 having at least one, and preferably a plurality, of predefined surface portions 40. In the preferred embodiment of the present invention, the predefined surface portions 40 are individual paddles that are each selectively angularly adjustable about a respective axis, for example 42,42′,42″,42‴ as shown in FIG. 3, extending radially outwardly from the longitudinal axis 22.

Each of the paddles 40 are fixed to a base member 44 having a plurality of index holes 46 disposed at predetermined radial positions with respect to the radial axis 42 of the paddle. Further, each of the paddles 40 have a central aperture 48 aligned with the respective radial axis 42, and are attached to a hub assembly 50 by removable bolts 52 extending through the central aperture. To provide easy installation and removal, the hub assembly 50 is preferably split into two halves, as best shown in FIG. 3, and is securely connected to the shaft 24 by a single bolt 52 extending through the aligned apertures 48 of oppositely mounted paddles. The other opposed pair of paddles are attached to the hub by individual bolts 52.

The hub 50, desirably has a flat mounting surface 54 provided for each of the paddles 40, and a pair of alignment pins 56,56′ extending outwardly from the flat mounting surface. The alignment pins 56,56′ are sized to mate with a selected pair of index holes 46 in the base member 44 so that the paddle 40 is maintained in a selected angular orientation with respect to a plane normal to the longitudinal axis 22 of the screw conveyor 10. In the preferred embodiment, the five index holes 46 are provided within opposed 90° arcuate sections on the base member 44. This arrangement of the index holes permits the paddles to be positioned at a desired one of sixteen different positions about the radial axis 42, at 22.5° increments. If more or less closely spaced angular incremental adjustment of the paddles is desired, the number, or position, of the index holes may be accordingly adjusted Furthermore, alternative indexing arrangements, such as tabs, slots or keyways may also be used to provide adjustable radial positioning of a paddle 40 with respect to its corresponding axis 42.

In the preferred embodiment of the present invention, the second material contacting member 38 is advantageously positioned near the inboard, or center drive end 26 of the shaft 24. The angular position of the paddle 40 is adjusted to provide a reverse, i.e., opposite to the primary direction of distribution, flow of paving material to the center section of machine. The paddles 40 can be easily adjusted by rotation about their respective radial axis to provide a sufficient, but not excessive, amount of properly mixed paving material to the region under the center drive system 18. Also, it is often desirable to provide similar paddle members at the outer or second end 28 of the shaft 24 to increase the amount of paving material delivered to an area lying beneath the outer bearing assembly 30. Furthermore, it may be desirable to strategically substitute adjustable paddles 40 for some of the helical segments 36 to overcome mixing or distribution problems with problem mixes.

INDUSTRIAL APPLICABILITY

The present invention is particularly useful in adapting fixed surface screw conveyor systems to applications requiring the transfer of materials having variable or divergent flow characteristics. For example, asphalt pavers are frequently required to lay down hot mix asphalt materials on a particular job, place cold mixes on another job, and repave with cold in situ recycled materials on yet another job. Although screw conveyors can be designed for each of these, or other, specific materials, it has heretofore been impossible to construct a screw conveyor that effectively places, at desired locations, optimum amounts of materials having differing flow properties. In particular, it has been difficult to direct an adequate, but not excessive, amount of paving material to regions lying immediately beneath drive case and bearing hanger components of the screw conveyor.

The adjustable paddle attachments 38 for the screw conveyor 10 embodying the present invention permit easy adjustment of the angular relationship between the material contacting surface of the paddle and the longitudinal axis of the conveyor. Further, the adjustable paddles may be selectively placed at desired positions along the longitudinal axis to aid in mixing or flow control of problem materials.

Other aspects, objects and advantages of this invention can be obtained from a study of the drawings, the disclosure, and the appended claims.

I claim:

1. A screw conveyor having a longitudinal axis, comprising:

a shaft disposed in concentric relationship with respect to said longitudinal axis and being rotatable about said axis;

a first material contacting member having a predefined surface angularly oriented in a fixed predetermined relationship with respect to said longitudinal axis, said first material contacting member being attached to said shaft; and, a second material contacting member comprising a hub assembly detachably connected to said shaft, and a plurality of paddle members extending radially outwardly form said hub assembly and detachably connected thereto, each of said paddle members having at least one predefined surface portion selectively angularly adjustable about an axis extending radially outwardly form said longitudinal axis.

* * * * *